United States Patent
Lee et al.

(10) Patent No.: US 12,370,629 B2
(45) Date of Patent: Jul. 29, 2025

(54) LASER CUTTING APPARATUS

(71) Applicants: SAMSUNG DISPLAY CO., LTD., Yongin-si (KR); Kyungpook National University Industry-Academic Cooperation Foundation, Daegu (KR)

(72) Inventors: Ho Lee, Daegu (KR); Woong Kim, Seoul (KR); Hyoshin Song, Daegu (KR); Seungsik Ham, Daegu (KR); Buemjoon Kim, Hwaseong-si (KR)

(73) Assignees: SAMSUNG DISPLAY CO., LTD., Yongin-si (KR); KYUNGPOOK NATIONAL UNIVERSITY INDUSTRY-ACADEMIC COOPERATION FOUNDATION, Yongin-si (KR)

( * ) Notice: Subject to any disclaimer, the term of this patent is extended or adjusted under 35 U.S.C. 154(b) by 351 days.

(21) Appl. No.: 16/354,395

(22) Filed: Mar. 15, 2019

(65) Prior Publication Data

US 2019/0299337 A1    Oct. 3, 2019

(30) Foreign Application Priority Data

Mar. 30, 2018 (KR) .................. 10-2018-0037450

(51) Int. Cl.
*B23K 26/38* (2014.01)
*B06B 1/06* (2006.01)
(Continued)

(52) U.S. Cl.
CPC ............... *B23K 26/38* (2013.01); *B06B 1/06* (2013.01); *B23K 26/046* (2013.01);
(Continued)

(58) Field of Classification Search
CPC .. B23K 26/38; B23K 26/046; B23K 26/0643; B23K 26/0648; B23K 26/08; B23K 26/082; B06B 1/06
See application file for complete search history.

(56) References Cited

U.S. PATENT DOCUMENTS 4,727,234 A * 2/1988 Oprysko ............... G03F 1/72
427/140
8,280,099 B2 * 10/2012 Harrison ............ B23K 26/0648
606/11
(Continued)

FOREIGN PATENT DOCUMENTS

JP    2005-279730    10/2005
JP    2007-326127    12/2007
(Continued)

OTHER PUBLICATIONS

F-theta lens information on thorlabs.com (Year: 2016).*
(Continued)

*Primary Examiner* — Steven W Crabb
*Assistant Examiner* — Fahmida Ferdousi
(74) *Attorney, Agent, or Firm* — F. CHAU & ASSOCIATES, LLC (57) ABSTRACT

A laser cutting apparatus includes a laser module, a vibration module, a motor module, a reflective module, and a concentrating module. The vibration module includes a lens module, and a piezoelectric module coupled to the lens module and configured to repeatedly expand and contract. The motor module is configured to move the vibration module in by transmitting power to the vibration module. The reflective module is configured to reflect the laser beam in such a way that a traveling direction of the laser beam is changed. The concentrating module is configured to concentrate the laser beam in such a way that energy of the laser beam reflected by the reflective surface is concentrated at a focal point.

20 Claims, 11 Drawing Sheets

(51) Int. Cl.
*B23K 26/046* (2014.01)
*B23K 26/06* (2014.01)
*B23K 26/08* (2014.01)
*B23K 26/082* (2014.01)
*B23K 26/40* (2014.01)

(52) U.S. Cl.
CPC ...... *B23K 26/0643* (2013.01); *B23K 26/0648* (2013.01); *B23K 26/08* (2013.01); *B23K 26/082* (2015.10); *B23K 26/40* (2013.01)

(56) References Cited

U.S. PATENT DOCUMENTS

| | | | | |
|---|---|---|---|---|
| RE44,886 | E * | 5/2014 | Lawson | B23K 26/0821 |
| | | | | 219/121.71 |
| 8,941,030 | B2 * | 1/2015 | Nomaru | B23K 26/02 |
| | | | | 219/121.68 |
| 9,108,268 | B2 * | 8/2015 | Nomaru | B23K 26/046 |

FOREIGN PATENT DOCUMENTS

| | | | | |
|---|---|---|---|---|
| JP | 2007326127 A | * | 12/2007 | ......... B23K 26/0057 |
| JP | 2009-124035 | | 6/2009 | |
| JP | 2010-036240 | | 2/2010 | |
| JP | 2013063445 A | * | 4/2013 | ............ B23K 26/02 |
| KR | 10-2011-0121497 | | 11/2011 | |
| KR | 10-1149594 | | 5/2012 | |
| KR | 10-2012-0126787 | | 11/2012 | |
| KR | 10-2013-0100491 | | 9/2013 | |
| KR | 20130100491 A | * | 9/2013 | |
| KR | 10-2015-0139213 | | 12/2015 | |
| KR | 10-2016-0041488 | | 4/2016 | |
| KR | 10-2017-0051646 | | 5/2017 | |

OTHER PUBLICATIONS

Galvanometer information on globalspec.com (Year: 2017).*
Piceramic.com (Year: 2017).*
Britannica.com/science/piezoelectricity (Year: 2017).*
Thorlabs PZT (Year: 2016).*
KR-20130100491-A (Year: 2013).*

* cited by examiner

LASER CUTTING APPARATUS

CROSS-REFERENCE TO RELATED APPLICATION

This application claims priority to Korean Patent Application No. 10-2018-0037450, filed on Mar. 30, 2018, and all the benefits accruing therefrom under 35 U.S.C. § 119, the content of which in its entirety is herein incorporated by reference.

BACKGROUND

The present disclosure relates to a laser cutting apparatus. Various kinds of cutting apparatuses may be used to cut a target. A laser cutting apparatus operates by focusing a laser on the target, causing sufficient heat to melt or vaporize a small portion of the target material near the focal point of the laser beam. Laser cutting apparatuses have been increasingly used due to their excellent cutting characteristics. For example, a laser cutting apparatus may be used in the process of manufacturing a display device.

However, when a target (such as a display device) is cut using a laser beam with a fixed focal point, thermal damage caused by the laser beam may accumulate and generate a lame amount of carbide near the cut. This may compromise the suitability of the cut component for its intended use.

SUMMARY

The present disclosure may provide a laser cutting apparatus capable of changing the position of a focal point at which energy of a laser beam is concentrated. The focal point may be continuously changed by a vibration module which vibrates according to a cycle.

In an embodiment of the inventive concepts, a laser cutting apparatus may include a laser module, a vibration module, a motor module, a reflective module, and a concentrating module.

The laser module may be configured to emit a laser beam.

The vibration module may include a lens module, and a piezoelectric module coupled to the lens module. The lens module may include a lens configured to transmit the laser beam, and a frame accommodating the lens. The piezoelectric module may be repeatedly expanded and contracted in a first direction when an electrical signal is applied thereto.

The motor module may be configured to move the vibration module in the first direction by transmitting power to the vibration module.

The reflective module may include a reflective surface configured to reflect the laser beam in such a way that a traveling direction of the laser beam is changed.

The concentrating module may be configured to concentrate the laser beam in such a way that energy of the laser beam reflected by the reflective surface is concentrated at a focal point.

In an embodiment, the laser cutting apparatus may further include a switching module configured to determine whether the laser beam emitted from the laser module is transmitted through the switching module or not in response to a control signal.

In an embodiment, the switching module may be disposed between the laser module and the vibration module, and the vibration module may be disposed between the switching module and the reflective module.

In an embodiment, the switching module may be disposed between the laser module and the reflective module, and the vibration module may be disposed between the reflective module and the concentrating module.

In an embodiment, the reflective module may be a galvanic mirror.

In an embodiment, the reflective module may further include a direction control module configured to control movement of the reflective surface.

In an embodiment, the concentrating module may concentrate the laser beam in such a way that the focal point is always located in the same plane regardless of a position at which the laser beam is incident. The concentrating module may include a flat-field scanning lens, an F-theta scanning lens, or a telecentric F-theta scanning lens.

In an embodiment, the laser cutting apparatus may further include a base module on which a cutting target to be processed by the laser beam is disposed. The plane in which the focal point is located may be substantially parallel to one surface of the base module.

In an embodiment of the inventive concepts, a laser cutting apparatus may include a laser module, a vibration module, a reflective module, a concentrating module, and a motor module.

The laser module may be configured to emit a laser beam.

The vibration module may include a lens module, and a piezoelectric module coupled to the lens module. The lens module may include a lens configured to transmit the laser beam, and a frame accommodating the lens. The piezoelectric module may be repeatedly expanded and contracted in a first direction when an electrical signal is applied thereto.

The reflective module may include a reflective surface configured to reflect the laser beam in such a way that a traveling direction of the laser beam is changed.

The concentrating module may be configured to concentrate the laser beam in such a way that energy of the laser beam reflected by the reflective surface is concentrated at a focal point.

The motor module may be configured to move the concentrating module by transmitting power to the concentrating module.

In an embodiment of the inventive concepts, a laser cutting apparatus may include a laser module, a switching module, a reflective module, a vibration module, and a motor module.

The laser module may be configured to emit a laser beam;

The switching module may be configured to determine whether the laser beam emitted from the laser module is transmitted through the switching module or not in response to a control signal.

The reflective module may include a reflective surface configured to reflect the laser beam transmitted through the switching module in such a way that a traveling direction of the laser beam is changed.

The vibration module may include a lens module, and a piezoelectric module coupled to the lens module. The lens module may include an object lens configured to concentrate energy of the laser beam reflected by the reflective surface at a focal point, and a frame accommodating the object lens. The piezoelectric module may be repeatedly expanded and contracted in a first direction when an electrical signal is applied thereto.

The motor module may be configured to move the vibration module in the first direction by transmitting power to the vibration module.

BRIEF DESCRIPTION OF THE DRAWINGS

The accompanying drawings are included to provide a further understanding of the inventive concepts, and are incorporated in and constitute a part of this specification. The drawings illustrate exemplary embodiments of the inventive concepts and, together with the description, serve to explain principles of the inventive concepts. In the drawings.

DETAILED DESCRIPTION OF THE EMBODIMENTS

The inventive concepts will now be described more fully with reference to the accompanying drawings, in which various embodiments are shown. The inventive concepts may, however, be embodied in many different forms, and should not be construed as limited to the embodiments set forth herein. Rather, these embodiments are provided so that this disclosure will be thorough and complete, and will fully convey the scope of the inventive concepts to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the to "and/or" includes any and all combinations of one or more of the associated listed items. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will he understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Figure 1A:
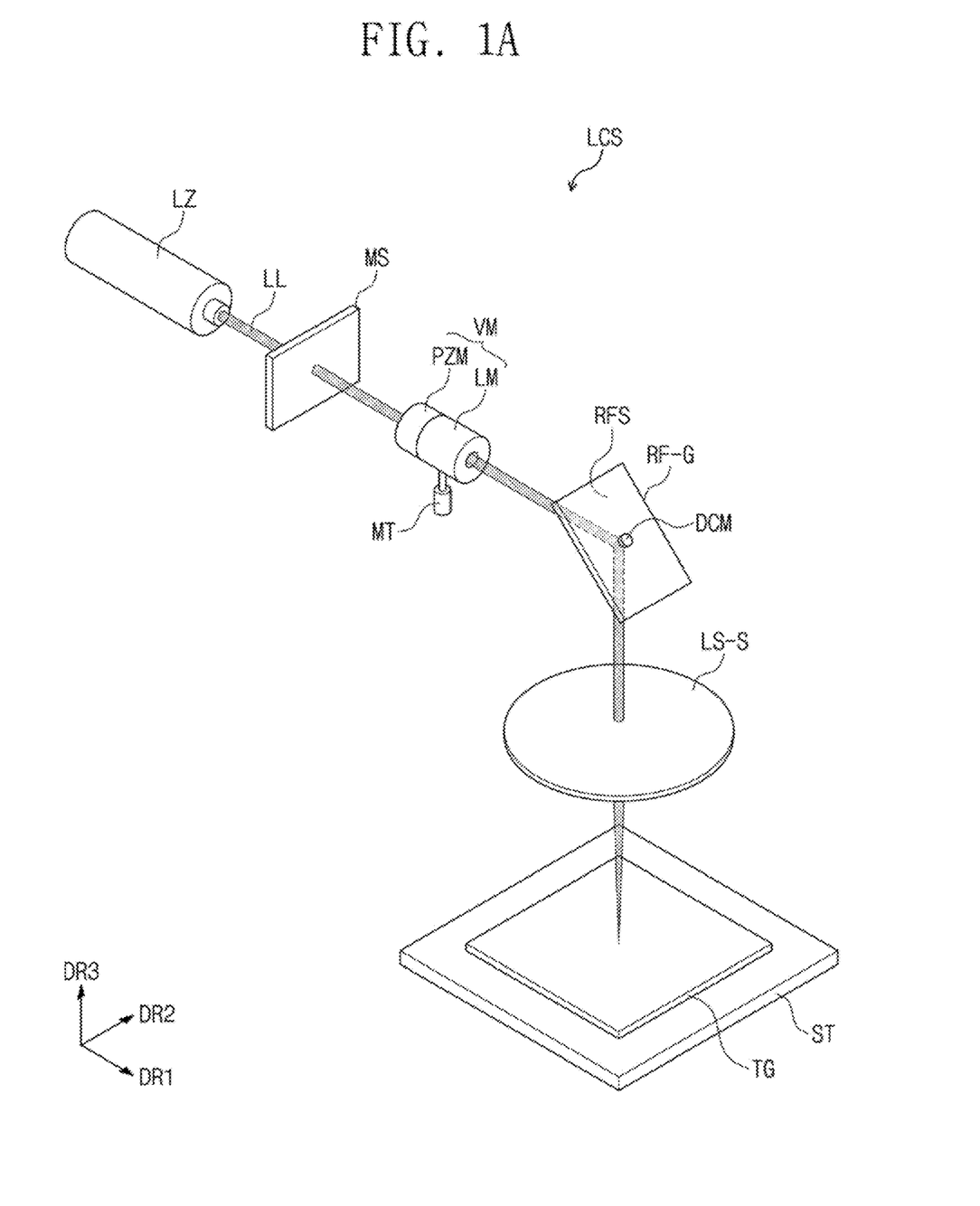
FIGS. 1A and 1B are perspective views illustrating a laser cutting apparatus according to an embodiment of the inventive concepts.
Figure 1B:
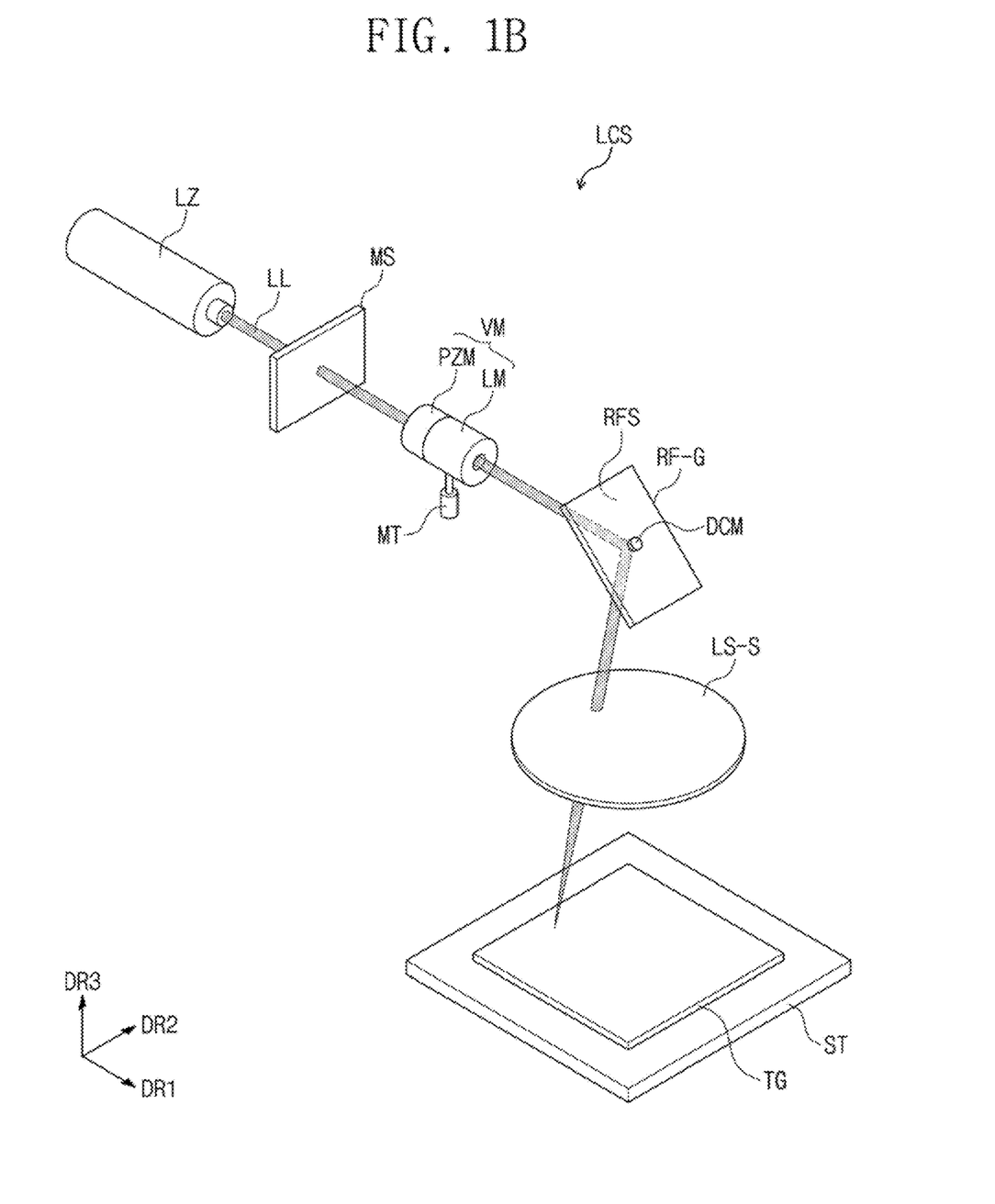
Figure 2A:
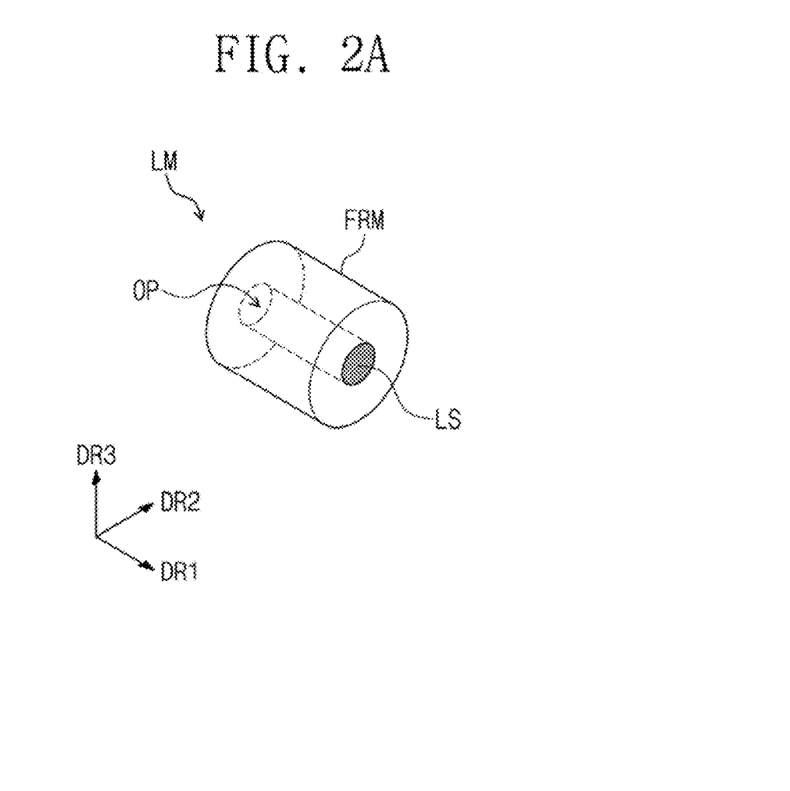
FIGS. 2A, 2B and 2C are perspective views illustrating lens modules according to various embodiments of the inventive concepts.
Figure 2B:
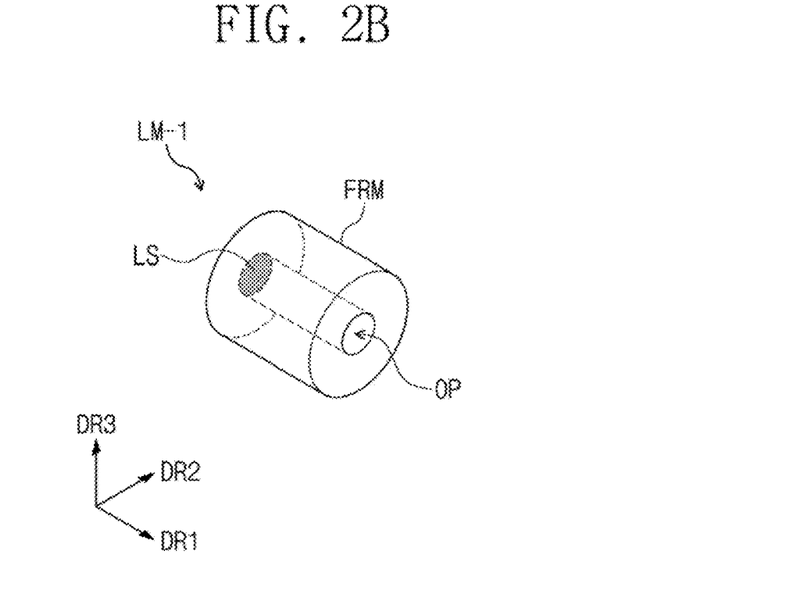
Figure 2C:
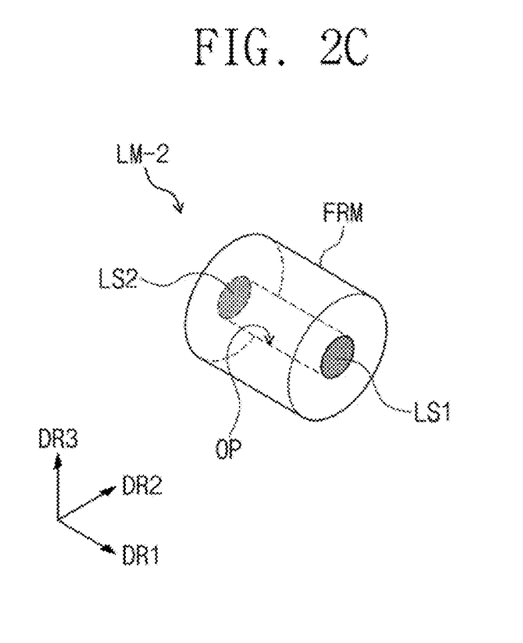
Figure 3:
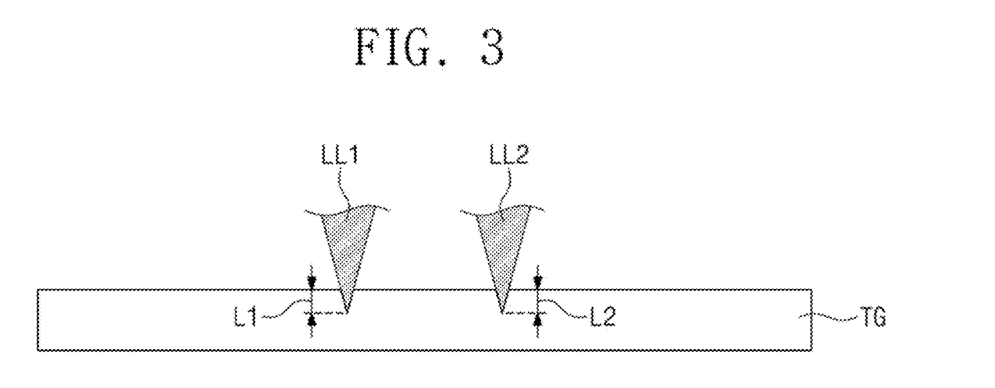
FIG. 3 is a cross-sectional view illustrating optical characteristics of a concentrating module according to an embodiment of the inventive concepts.
Figure 4A:
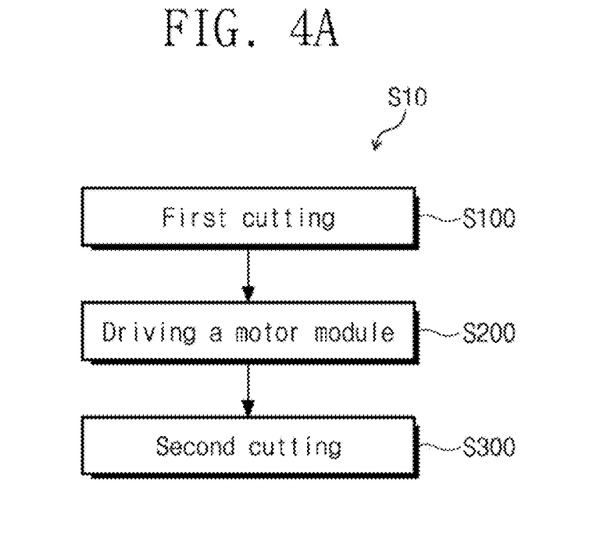
FIG. 4A is a flowchart illustrating a method of performing a cutting process using a laser cutting apparatus according to an embodiment of the inventive concepts.
Figure 4B:
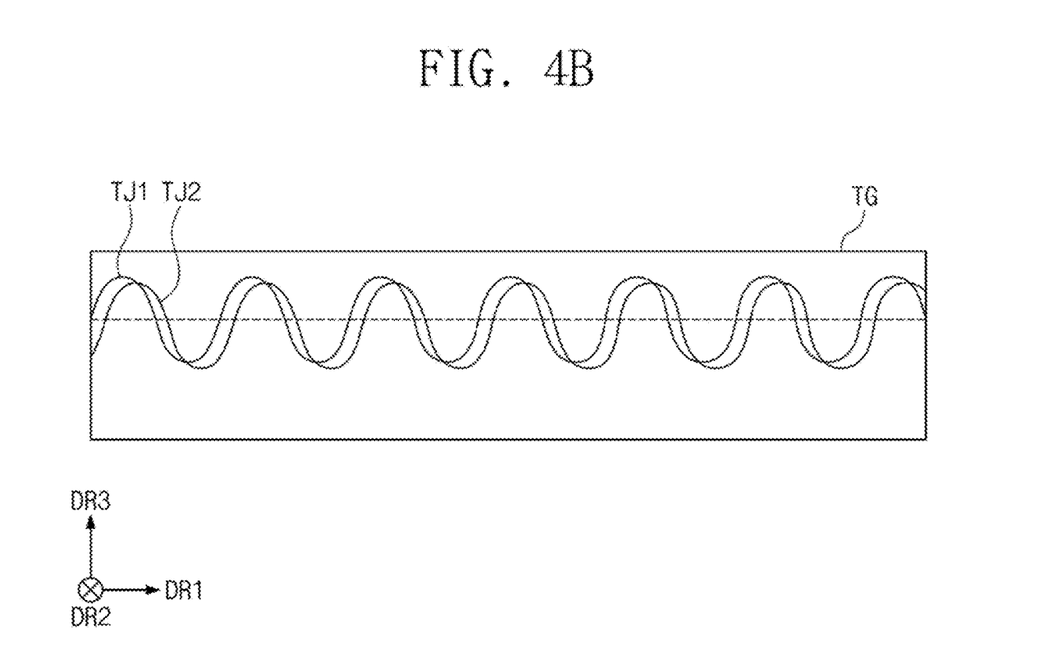
FIG. 4B illustrates a path of a focal point of a laser beam used in a cutting process using a laser cutting apparatus according to an embodiment of the inventive concepts.

FIGS. 1A and 1B are perspective views illustrating a laser cutting apparatus LCS according to an embodiment of the inventive concepts. For example, FIG. 1B may illustrate an example of a laser cutting apparatus LCS after adjusting a reflective module RF-G of the laser cutting apparatus LCS shown in FIG. 1A. FIGS. 2A, 2B and 2C are perspective views illustrating lens modules LM, LM-1 and LM-2 according to various embodiments of the inventive concepts. FIG. 3 is a cross-sectional view illustrating optical characteristics of a concentrating module LS-S according to an embodiment of the inventive concepts, FIG. 4A is a flowchart illustrating a method of performing a cutting process 510 by using the laser cutting apparatus LCS according to an embodiment of the inventive concepts. FIG. 4B illustrates a path of a focal point of a laser beam LL used in the cutting process using the laser cutting apparatus LCS according to an embodiment of the inventive concepts.

The laser cutting apparatus LCS according to an embodiment of the inventive concepts may include a laser module LZ, a switching module MS, a vibration module. VM, motor module MT, a reflective module RF-G, a concentrating module LS-S, and a base module Sr.

The laser module LZ may emit a laser beam LL. A kind or a wavelength of the laser beam LL emitted from the laser module LZ is not limited to a specific kind or a specific wavelength but may differ depending on a use of the laser cutting apparatus LCS or on a target to be cut (which may be referred to as 'a cutting target').

In various embodiments of the inventive concepts, the laser module LZ may emit an infrared (IR) femto laser, a green pico laser, an ultraviolet (UV) pico laser, or a carbon dioxide ($CO_2$) laser.

The switching module MS may allow the laser beam LL emitted from the laser module LZ to continuously travel or may block the laser beam LL. In other words, the switching module MS may be a shutter which determines whether the laser beam LL is transmitted or not in response to a control signal.

The vibration module VM may include a lens module LM and a piezoelectric module PZM.

Referring to FIG. 2A, the lens module LM may include a lens LS transmitting the laser beam LL incident thereto and a frame FRM accommodating the lens LS. A through-hole OP may be defined in the frame FRM. The lens LS may be disposed at a position corresponding to one end of the through-hole OP the end through which the laser beam LL exits the lens module LM), and the piezoelectric module PZM may be disposed adjacent to another end of the through-hole OP (e.g., the end through which the laser beam LL enters the lens module LM).

Referring to FIG. 2B, a lens module LM-1 may include the lens LS transmitting the laser beam LL incident thereto and the frame FRM accommodating the lens LS. Unlike FIG. 2A, in the lens module LM-1 of FIG. 2B, the lens LS may be disposed at a position corresponding to the other end of the through-hole OP (e.g., the end through which the laser beam LL enters the lens module LM), and the piezoelectric module PZM may also be disposed adjacent to the other end of the through-hole OP (e.g., the end through which the laser beam LL exits the lens module LM).

Referring to FIG. 2C, a lens module LM-2 may include lenses LS1 and LS2 transmitting the laser beam LL incident thereto and the frame FRM accommodating the lenses LS1 and LS2.

Unlike FIGS. 2A and 2B, in the lens module LM-2 of FIG. 2C, the lenses LS1 and LS2 may be disposed at positions corresponding to both ends of the through-hole OP, respectively. The piezoelectric module PZM may be disposed adjacent to a first lens LS1 or a second lens LS2.

FIGS. 2A to 2C illustrate example shapes of the lens modules LM, LM-1 and LM-2. However, embodiments of the inventive concepts are not limited thereto. In other embodiments, the structure of the lens module LM, LM-1 or LM-2 and/or the number of the lens LS of the lens module LM, LM-1 or LM-2 may be variously modified. For example, although the lens modules LM, LM-1 and LM-2 (and the opening OP therein) are represented as cylindrical, they may also take other harms including prims, cones, pyramids, or truncated cones or pyramids.

The piezoelectric module PZM may be coupled to the lens module LM. In FIGS. 1A and 1B, the piezoelectric module PZM is disposed outside the lens module LM and is coupled to the lens module LM. However, embodiments of the inventive concepts are not limited thereto. In another embodiment of the inventive concepts, the piezoelectric module PZM may be disposed in the lens module LM. In other words, the piezoelectric module PZM may be accommodated in the frame FRM of the lens module LM.

When an electrical signal is applied to the piezoelectric module PZM, the piezoelectric module PZM may be repeatedly expanded and contracted in a first direction DR1.

In an embodiment of the inventive concepts, a difference between a length of the piezoelectric module PZM when it is contracted and a length of the piezoelectric module PZM when it is expanded may range from about 50 µm to about 80 µm. Thus, the lens module LM coupled to the piezoelectric module PZM may vibrate in the first direction DR1 and may vibrate by a distance of about 50 µm to about 80 µm. However, the length difference between the contraction and the expansion of the piezoelectric module PZM and the distance by which the lens module LM vibrates are not limited thereto but may be variously changed as needed.

In an embodiment of the inventive concepts, the piezoelectric module PZM may include lead zirconate titanate (PZT). However, embodiments of the inventive concepts are not limited thereto. In another embodiment, the piezoelectric module PZM may include at least one of known piezoelectric elements.

The motor module MT may transmit power to the vibration module VM. In FIGS. 1A and 1B, the vibration module VM receiving the power from the motor module MT may be moved in the first direction DR1 by a distance of several micrometers to several tens of micrometers.

The reflective module RF-G may include a reflective surface RFS that reflects the laser beam LL incident thereto to change a traveling direction of the laser beam LL.

In an embodiment of the inventive concepts, the reflective module RF-G may change the traveling direction of the incident laser beam LL into various directions. Referring to FIGS. 1A and 1B, a traveling direction of the laser beam LL reflected by the reflective module RF-G in FIG. 1A may be different from a traveling direction of the laser beam LL reflected by the reflective module in FIG. 1B.

Since the traveling direction of the laser beam LL is changed by the reflective module RF-G as described above, a cutting target TG may be cut into a desired shape without moving the base module ST.

In an embodiment of the inventive concepts, the reflective module RF-G may be a galvanic mirror.

In an embodiment of the inventive concepts, the reflective module RF-G may further include a direction control module DCM configured to control movement of the reflective surface RFS. For example, the direction control module DCM may be a tilt device which is electronically or mechanically driven. In another embodiment, the direction control module DCM may be omitted.

The concentrating module LS-S may concentrate the laser beam LL incident thereto in such a way that energy of the laser beam LL is concentrated at a focal point.

In an embodiment, the concentrating module LS-S may concentrate the laser beam LL in such a way that the focal point of the laser beam LL is always located at the same plane regardless of a position at which the laser beam LL is incident. For example, the concentrating module LS-S may include a flat-field scanning lens, an F-theta scanning lens, or a telocentric F-theta scanning lens.

FIG. 3 illustrates a cross-sectional view for comparing a laser beam LL1 (hereinafter, referred to as 'a first laser beam') provided from the laser cutting apparatus LCS of FIG. 1A to the cutting target TG with a laser beam LL2 (hereinafter, referred to as 'a second laser beam') provided from the laser cutting apparatus LCS of FIG. 1B to the cutting target TG when the piezoelectric module PZM and the motor module MT are not driven.

Referring to FIG. 3, focal points of the laser beams LL1 and LL2 transmitted through the concentrating module LS-S may be formed at the same plane. In other words, a first distance L1 from a top surface of the cutting target TG to a portion at which the focal point of the first laser beam LL1 is formed may be substantially equal to a second distance L2 from the top surface of the cutting target TG to a portion at which the focal point of the second laser beam LL2 is formed.

If a cutting process is performed using the laser beams LL1 and LL2 in the state in which the piezoelectric module PZM and the motor module MT are not driven, thermal energy may be accumulated in a cut portion of the cutting target TG by the laser beams LL1 and LL2 continuously applied to the same plane. Thus, a large amount of a carbide may be generated in the cut portion of the cutting target TG.

However, according to an embodiment of the inventive concepts, the laser beam LL may be irradiated a plurality of times to a portion of the cutting target TG by the laser cutting apparatus LCS while driving the piezoelectric module PZM and/or the motor module MT, thereby performing a cutting process. Thus, the amount of the generated carbide may be reduced or minimized.

In more detail, as illustrated in FIG. 4A, a cutting process S10 according to an embodiment of the inventive concepts may include first cutting (S100), driving the motor module (S200), and second cutting (S300).

In the first cutting operation S100, the cutting target TG may be cut while vibrating the lens module LM by driving the piezoelectric module PZM. In the first cutting operation S100, output power of the laser beam LL may not be sufficient to cut the cutting target TG at one time. This may be because probability of occurrence of defects such as a carbide generated at a cut surface increases when the output power of the laser beam LL is great.

Thus, a position of the vibration module VM may be changed through the operation S200 of driving the motor module, and then, the cutting target TG may be cut again while vibrating the lens module LM by driving the piezoelectric module PZM in the second cutting operation S300.

Referring to FIG. 4B, a first trajectory curve TJ1 illustrates an example of a path of a focal point of the laser beam LL used in the first cutting operation S100. The position of the focal point of the laser beam LL may be changed in upward and downward directions (i,e., in a third direction DR3 substantially perpendicular to the first direction DR1 and to the plane of a surface of the cutting target TG) by driving the vibration module VM, and the position of the focal point of the laser beam LL may be changed in left and right directions by the reflective module RF-G. Thus, the first trajectory curve TJ1 may have a sine curve shape or a cosine curve shape.

A second trajectory curve TJ2 illustrates an example of a path of a focal point of the laser beam LL used in the second cutting operation S300. The position of the focal point of the laser beam LL may be changed in upward and downward directions by driving the vibration module VM, and the position of the focal point of the laser beam LL may be changed in left and right directions by the reflective module RF-G. Thus, the second trajectory curve 112 may have a sine curve shape or a cosine curve shape.

In the operation S200 of driving the motor module, a position of the vibration module VM may be moved in a direction away from the laser module LZ, and thus total positions of the focal point of the laser beam LL may become lower (i.e., according to the third direction DR3) than those of the focal point of the laser beam LL used in the first cutting operation S100. Thus, a reference position of the second trajectory curve TJ2 may be lower than a reference position of the first trajectory curve TJ1.

The first trajectory curve ill may not coincide with the second trajectory curve TJ2 in the left and right directions (i.e., in first direction DR1 which may correspond to the traveling direction of the laser beam LL). This may be because a position at which maximum energy of the laser beam LL is provided in the first cutting operation S100 does not exactly coincide with a position at which maximum energy of the laser beam LL is provided in the second cutting operation S300, in a plane defined by the first direction DR1 and a second direction DR2.

As a result, the generation of the carbide at the cut surface may be inhibited by a difference between the first trajectory curve TJ1 and the second trajectory curve TJ2.

FIGS. 5, 6, 7 and 8 are perspective views illustrating laser cutting apparatuses LCS-1, LCS-2, LCS-3 and LCS-4 according to various embodiments of the inventive concepts.

Figure 5:
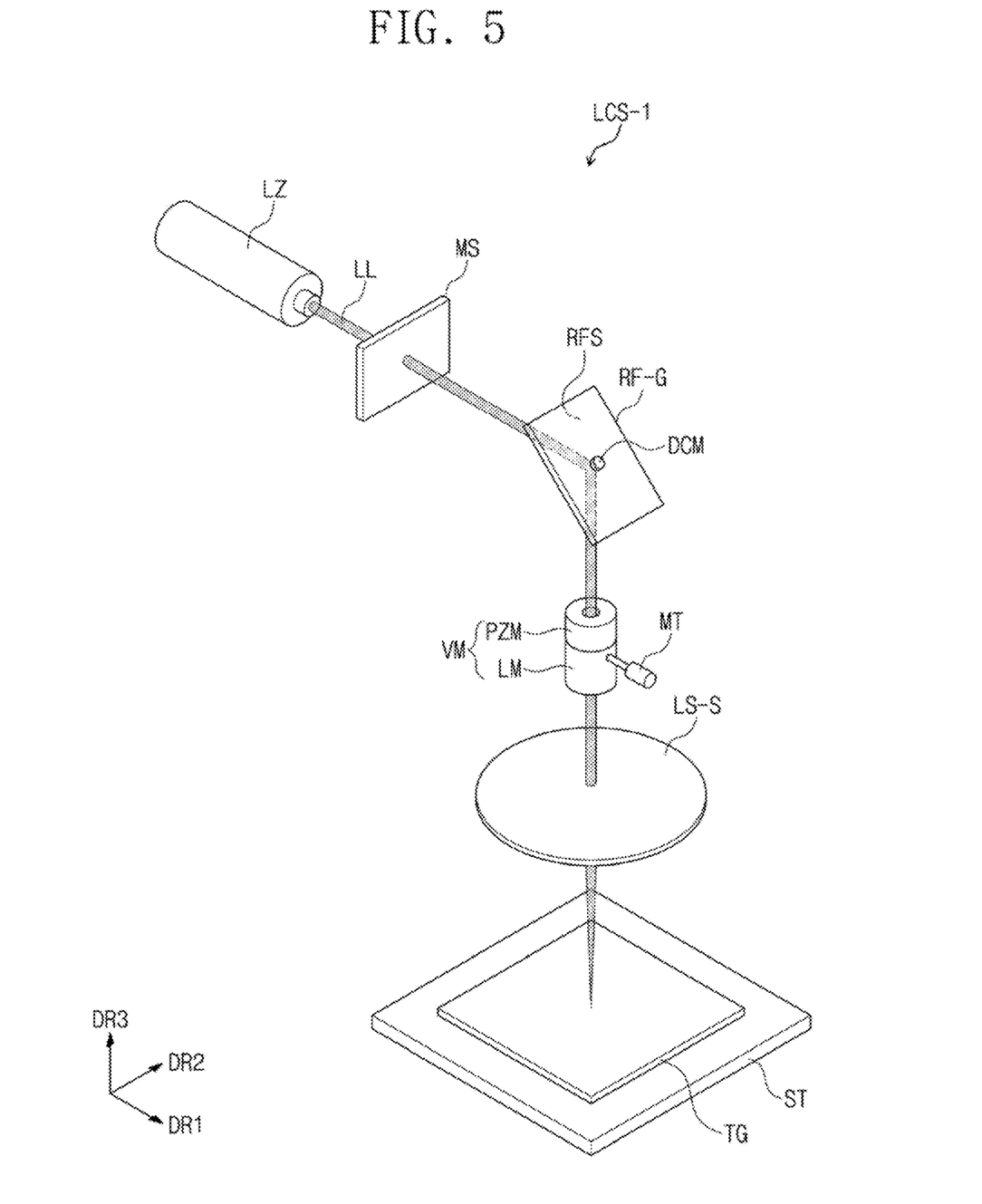
FIGS. 5, 6, 7 and 8 are perspective views illustrating laser cutting apparatuses according to various embodiments of the inventive concepts.

A position of a vibration module VM of a laser cutting apparatus LCS-1 illustrated in FIG. 5 is different from that of the vibration module VM of the laser cutting apparatus LCS illustrated in FIGS. 1A and 1B. In more detail, the vibration module VM of the laser cutting apparatus LCS-1 may be disposed between the reflective module RF-G and the concentrating module LS-S.

When an electrical signal is applied to the laser cutting apparatus LCS-1, the piezoelectric module PZM of the laser cutting apparatus LCS-1 may be repeatedly expanded and contracted in a third direction DR3 perpendicular to the first and second directions DR1 and DR2. Thus, the lens module LM may vibrate in the third direction DR3.

In the laser cutting apparatus LCS-1, the vibration module VM receiving power from the motor module MT may be moved in the third direction DR3 by a distance of several micrometers to several tens of micrometers.

Other descriptions to the laser cutting apparatus LCS-1 may be substantially the same as mentioned with reference to FIGS. 1A to 4B and thus are omitted.

Figure 6:
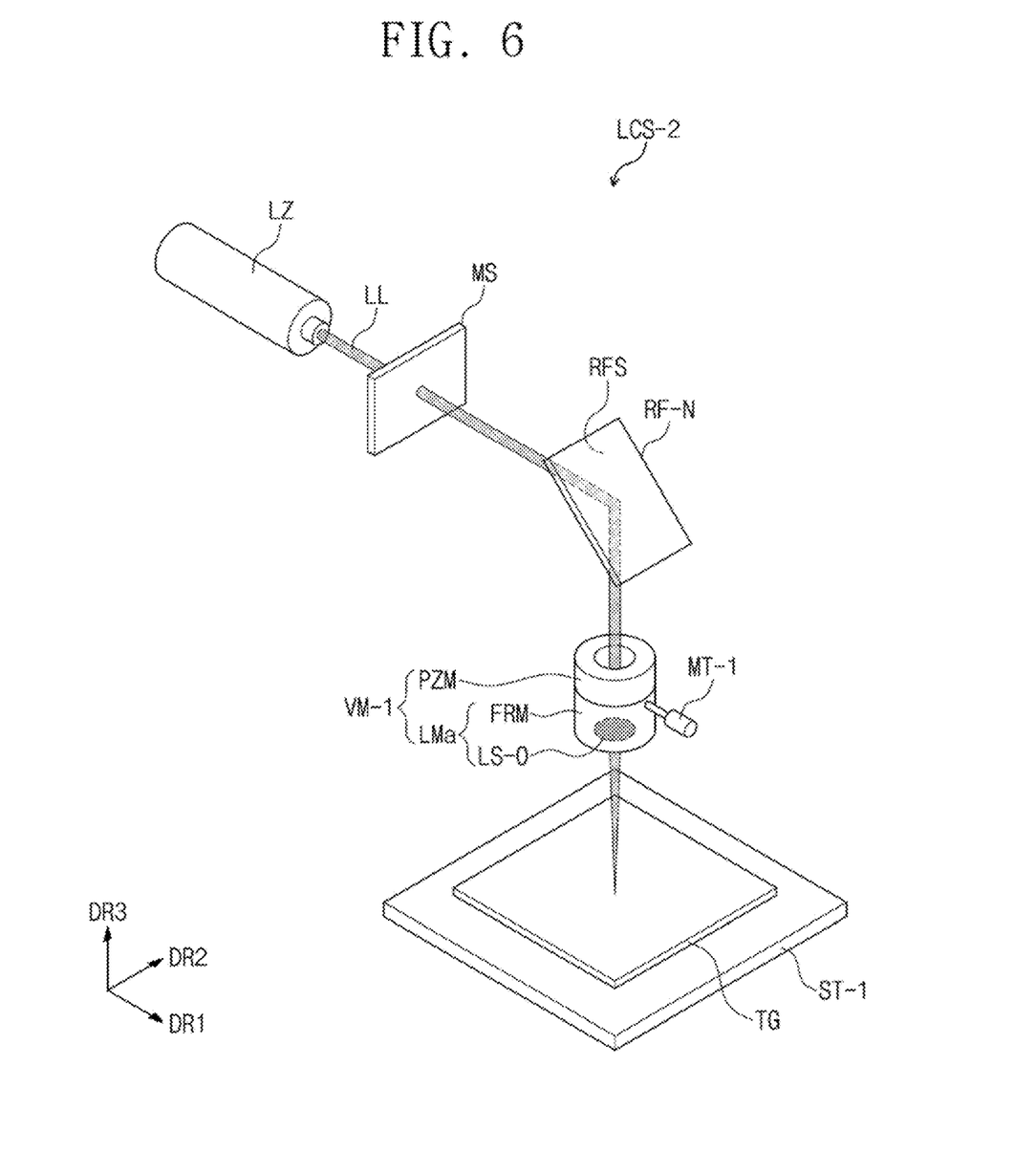

A laser cutting apparatus LCS -2 illustrated in FIG. 6 may include a laser module LZ, a switching module MS, a reflective module RF-N, a vibration module VM-1, a motor module MT-1, and a base module ST-1.

The laser module LZ and the switching module MS may be substantially the same as described above, and thus the descriptions thereto are omitted.

The reflective module RF-N of the laser cutting apparatus LCS-2 may reflect an incident laser beam LL in one fixed direction, unlike the reflective modules RF-G of the laser cutting apparatuses LCS and LCS-1 described above.

The vibration module VM-1 may include a lens module LMa and a piezoelectric module PZM.

The lens module LMa may include an object lens LS-O configured to concentrate the laser beam LL at a focal point and a frame FRM accommodating the object lens LS-O.

The concentrating module LS-S may concentrate the laser beam LL in each of the laser cutting apparatuses LCS and LCS-1 described above. However, in the laser cutting apparatus LCS-2 of FIG. 6, the object lens LS-O of the lens module LMa coupled to the piezoelectric module PZM may concentrate the laser beam LL.

The piezoelectric module PZM may be coupled to the lens module LMa to vibrate the lens module LMa in the third direction DR3.

The motor module MT-1 may transmit power to the vibration module VM-1 to move the vibration module VM-1 in the third direction DR3.

Unlike the laser cutting apparatuses LCS and LCS-1 described above, the laser cutting apparatus LCS-2 of FIG. 6 may not change an irradiated position of the laser beam LL by the reflective module RF-N and the vibration module VM-1 in a plane defined by the first and second directions DR1 and DR2. Thus, the base module ST-1 may be moved to cut the cutting target TG.

Figure 7:
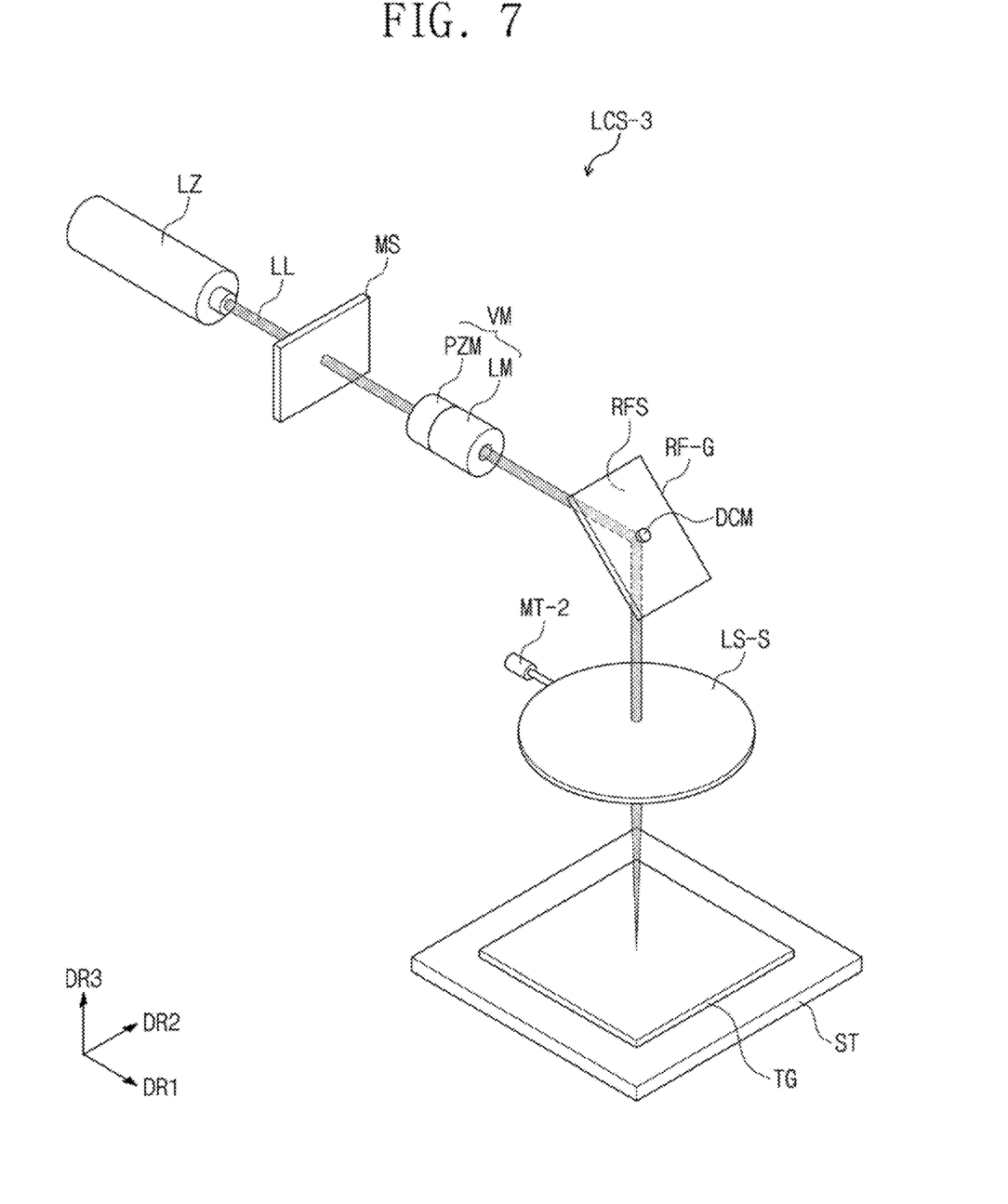

A position and a function of a motor module MT-2 of a laser cutting apparatus LCS-3 illustrated in FIG. 7 are different from those of the motor module MT of the laser cutting apparatus LCS illustrated in FIGS. 1A and 1B. In detail, the motor module MT-2 of the laser cutting apparatus LCS-3 may transmit power to the concentrating module LS-S to move the concentrating module LS-S in the third direction DR3.

Other descriptions to the laser cutting apparatus LCS-3 may be substantially the same as mentioned with reference to FIGS. 1A and 1B and thus are omitted.

Figure 8:
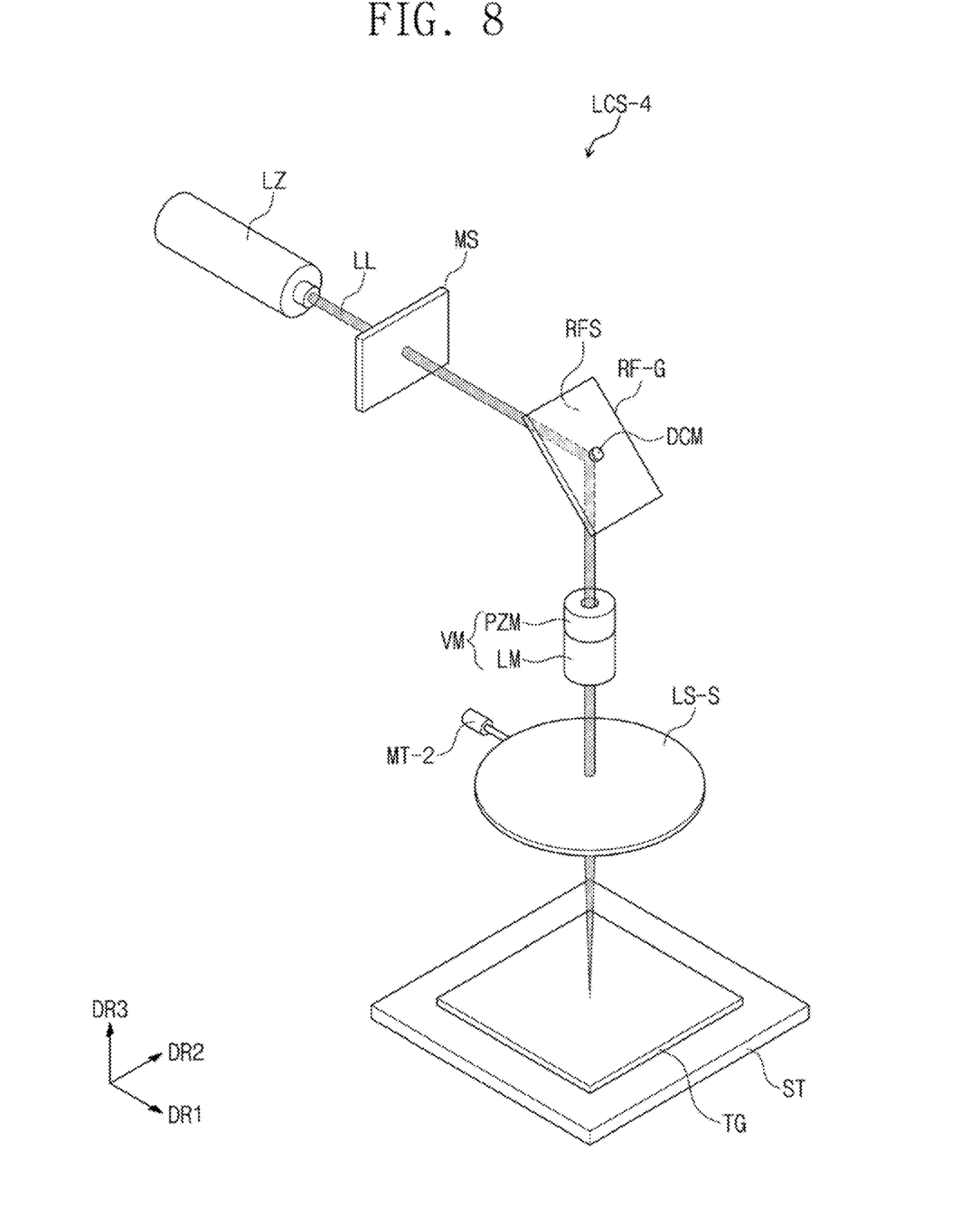

A position and a function of a motor module MT-2 of a laser cutting apparatus LCS-4 illustrated in FIG. 8 are different from those of the motor module MT of the laser cutting apparatus LCS-1 illustrated in FIG. 5. In detail, the motor module MT-2 of the laser cutting apparatus LCS-4 may transmit power to the concentrating module LS-S to move the concentrating module LS-S in the third direction DR3.

Other descriptions of the laser cutting apparatus LCS-4 may be substantially the same as corresponding descriptions of the laser cutting apparatus LCS-1 of FIG. 5 and thus are omitted.

Figure 9A:
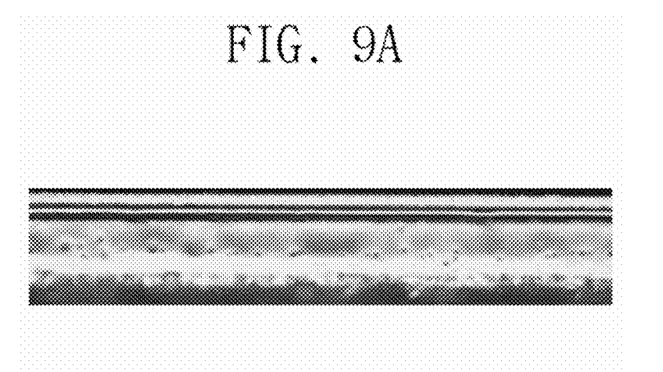
FIG. 9A shows a cut surface of a cutting target cut by a typical laser cutting apparatus.
Figure 9B:
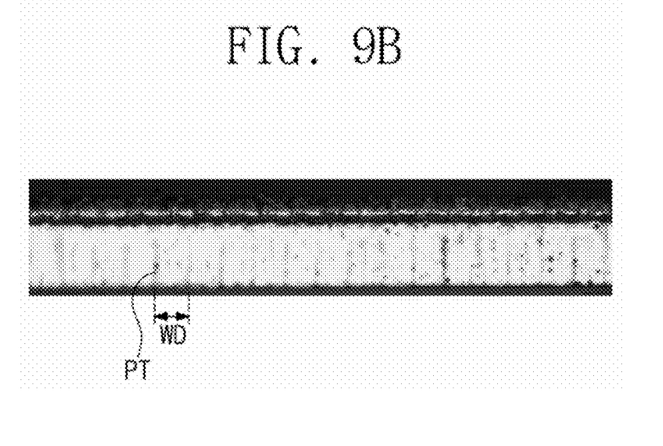
FIG. 9B shows a cut surface of a cutting target cut by a laser cutting apparatus according to an embodiment of the inventive concepts.

FIG. 9A shows a cut surface of a cutting target cut by a typical laser cutting apparatus. FIG. 9B shows a cut surface of a cutting target cut by the laser cutting apparatus LCS, LCS-1, LCS-2, LCS-3 or LCS-4 according to an embodiment of the inventive concepts.

Referring to FIG. 9A, regularly formed patterns do not exist in a cut surface of a target cut by a typical laser cutting apparatus. On the contrary, referring to FIG. 9B, patterns PT formed at specific distances WD exist in a cut surface of the cutting target TG (see FIG. 1A) cut by the laser cutting apparatus LCS, LCS-1, LCS-2, LCS-3 or LCS-4 according to an embodiment of the inventive concepts. The piezoelectric module PZM is repeatedly expanded and contracted in a predetermined cycle, and thus a position at which the laser beam is concentrated is repeatedly changed in the predetermined cycle. As a result, the patterns PT are formed at the specific distances WD in the cut surface.

According to the embodiments of the inventive concepts, the position of the focal point at which the energy of the laser beam is concentrated may be continuously changed by the laser cutting apparatus in the process of cutting the target, and thus the amount of the carbide generated at the cut portion may be reduced or minimized.

While the inventive concepts have been described with reference to example embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A laser cutting apparatus comprising:
   a laser module configured to emit a laser beam;
   a vibration module disposed in a path of the laser beam emitted by the laser module and comprising:
      a lens module; and
      a piezoelectric module in direct physical contact with the lens module, wherein the lens module comprises:
         a lens configured to transmit the laser beam in a first direction; and
         a frame accommodating the lens,
         wherein the piezoelectric module is configured to vibrate the vibration module using a vibrating motion parallel to the first direction by repeatedly expanding and contracting in the first direction when an electrical signal is applied thereto,
         wherein the vibrating causes a focal point of the laser beam to continuously follow a first trajectory curve during a first cutting operation based at least in part on the vibrating and a traveling direction of the laser beam,
         wherein the first trajectory curve comprises a sine curve shape with a first maximum point and a first minimum point;
   a motor module in direct contact with the vibration module and configured to move a position of the vibration module in the first direction using a driving motion other than the vibrating motion and parallel to the vibrating motion to cause the focal point of the laser beam to continuously follow a second trajectory curve during a second cutting operation based at least in part on the vibrating and the traveling direction of the laser beam,
   wherein the second trajectory curve comprises the sine curve shape with a second maximum point lower than the first maximum point and a second minimum point lower than the first minimum point;
   a reflective module disposed in the path of the laser beam from the vibration module and comprising:
      a reflective surface configured to reflect the laser beam in such a way that the traveling direction of the laser beam is changed based on a movement of the reflective surface; and
      a concentrator configured to concentrate the laser beam in such a way that energy of the laser beam reflected by the reflective surface is concentrated at the focal point.

2. The laser cutting apparatus of claim 1, further comprising: a switch configured to determine whether the laser beam emitted from the laser module is transmitted through the switch in response to a control signal,
   wherein the switch is disposed between the laser module and the vibration module, and the vibration module is disposed between the switch and the reflective module.

3. The laser cutting apparatus of claim 1, further comprising: a switch configured to determine whether the laser beam emitted from the laser module is transmitted through the switch in response to a control signal,
   wherein the switch is disposed between the laser module and the reflective module, and the vibration module is disposed between the reflective module and the concentrator.

4. The laser cutting apparatus of claim 1, wherein the reflective module is a galvanic mirror.

5. The laser cutting apparatus of claim 1, wherein the reflective module further comprises: a direction controller configured to control movement of the reflective surface.

6. The laser cutting apparatus of claim 1, wherein the concentrator concentrates the laser beam in such a way that the focal point is always located in the same plane perpendicular to a surface of a base module supporting a cutting target regardless of a position at which the laser beam is incident.

7. The laser cutting apparatus of claim 6, wherein the concentrator includes a flat-field scanning lens, an F-theta scanning lens, or a telecentric F-theta scanning lens.

8. The laser cutting apparatus of claim 7,
   wherein the first trajectory curve and the second trajectory curve are formed without moving the base module relative to the laser module.

9. A laser cutting apparatus comprising:
   a laser module configured to emit a laser beam;
   a vibration module disposed in a path of the laser beam emitted by the laser module and comprising:
      a lens module; and
      a piezoelectric module in direct contact with the lens module,
      wherein the lens module comprises:
         a lens configured to transmit the laser beam in a first direction; and
         a frame accommodating the lens,
         wherein the piezoelectric module is configured to vibrate the vibration module using a vibrating motion parallel to the first direction by repeatedly expanding and contracting in the first direction when an electrical signal is applied thereto,
         wherein the vibrating causes a focal point of the laser beam to continuously follow a first trajectory curve during a first cutting operation based at least in part on the vibrating and a traveling direction of the laser beam, wherein the first trajectory curve comprises a sine curve shape with a first maximum point and a first minimum point;
   a reflective module in the path of the laser beam emitted by the laser module and comprising:
      a reflective surface configured to reflect the laser beam in such a way that the traveling direction of the laser beam is changed based on a movement of the reflective surface;

a concentrator in the path of the laser beam from the reflective module and configured to concentrate the laser beam in such a way that energy of the laser beam reflected by the reflective surface is concentrated at the focal point; and a motor module in direct contact with the concentrator and configured to move the concentrator along the path of the laser beam by transmitting power to the concentrator in a third direction using a driving motion other than the vibrating motion to cause the focal point of the laser beam to continuously follow a second trajectory curve during a second cutting operation based at least in part on the vibrating and the traveling direction of the laser beam, wherein the second trajectory curve comprises the sine curve shape with a second maximum point lower than the first maximum point and a second minimum point lower than the first minimum point.

10. The laser cutting apparatus of claim 9, further comprising:
a switch configured to determine whether the laser beam emitted from the laser module is transmitted through the switch in response to a control signal.

11. The laser cutting apparatus of claim 10, wherein the switch is disposed between the laser module and the vibration module, and the vibration module is disposed between the switch and the reflective module.

12. The laser cutting apparatus of claim 10, wherein the switch is disposed between the laser module and the reflective module, and the vibration module is disposed between the reflective module and the concentrator.

13. The laser cutting apparatus of claim 12, wherein the motor module moves the concentrator in the third direction.

14. The laser cutting apparatus of claim 9, wherein the reflective module is a galvanic mirror.

15. The laser cutting apparatus of claim 9, wherein the reflective module further comprises: a direction controller module configured to control movement of the reflective surface.

16. The laser cutting apparatus of claim 9, wherein the concentrator concentrates the laser beam in such a way that the focal point is always located in the same plane regardless of a position at which the laser beam is incident.

17. The laser cutting apparatus of claim 16, wherein the concentrator includes a flat-field scanning lens, an F-theta scanning lens, or a telecentric F-theta scanning lens.

18. A laser cutting apparatus comprising:
a laser module configured to emit a laser beam;
a vibration module disposed in a path of the laser beam emitted by the laser module and comprising:
a lens module; and
a piezoelectric module in direct physical contact with the lens module,
wherein the lens module comprises:
a lens configured to transmit the laser beam in a first direction; and
a frame accommodating the lens,
wherein the piezoelectric module is configured to vibrate the vibration module using a vibrating motion parallel to the first direction by repeatedly expanding and contracting in the first direction when an electrical signal is applied thereto;
a motor module in direct contact with the vibration module and configured to move a position of the vibration module in the first direction along the path of the laser beam emitted by the laser module using a driving motion, other than the vibrating motion; and
a reflective module in the path of the laser beam from the vibration module and comprising:
a reflective surface configured to reflect the laser beam in such a way that a traveling direction of the laser beam is changed based on a movement of the reflective surface; and
a concentrator configured to concentrate the laser beam in such a way that energy of the laser beam reflected by the reflective surface is concentrated at a focal point.

19. The laser cutting apparatus of claim 18, wherein the concentrator concentrates the laser beam in such a way that the focal point is always located in the same plane perpendicular to a surface of a base module supporting a cutting target regardless of a position at which the laser beam is incident, wherein the cutting target is secured by the base module in a static position relative to the laser module.

20. The laser cutting apparatus of claim 18, further comprising a switch configured to determine whether the laser beam emitted from the laser module is transmitted through the switch in response to a control signal,
wherein the switch is disposed between the laser module and the reflective module.

* * * * *